United States Patent [19]

Matsumoto et al.

[11] 4,255,032
[45] Mar. 10, 1981

[54] CAMERA WITH A HOLOGRAPHIC INDICATOR

[75] Inventors: Kazuya Matsumoto; Susumu Matsumura; Takashi Suzuki, all of Yokohama, Japan

[73] Assignee: Canon Kabushiki Kaisha, Tokyo, Japan

[21] Appl. No.: 60,283

[22] Filed: Jul. 25, 1979

[30] Foreign Application Priority Data

Jul. 27, 1978 [JP] Japan ................................ 53/92234

[51] Int. Cl.³ ...................... G03B 17/20; G03B 13/02; G03H 1/22
[52] U.S. Cl. ..................................... 354/53; 350/3.85; 354/289
[58] Field of Search ................................ 354/22, 53-57, 354/219, 289; 350/3.85-3.86

[56] References Cited

U.S. PATENT DOCUMENTS

| | | | |
|---|---|---|---|
| 3,560,921 | 2/1971 | Lopez | 350/3.85 X |
| 3,633,988 | 1/1972 | Farrar | 350/3.72 X |
| 3,680,945 | 8/1972 | Sheridon | 350/3.61 |
| 4,165,930 | 8/1979 | Matsumoto et al. | 354/289 X |

FOREIGN PATENT DOCUMENTS

1532389  6/1968  France ..................... 350/3.85

*Primary Examiner*—George H. Miller, Jr.
*Assistant Examiner*—Thomas H. Tarcza
*Attorney, Agent, or Firm*—Fitzpatrick, Cella, Harper & Scinto

[57] ABSTRACT

A camera having a holographic indicator in which a focused image hologram is held on an image plane of the view finder of the camera and a light source is arranged to illuminate the hologram in such a direction that the light transmitted through the hologram goes out of the path of the view finder. The hologram may be also a relief type blazed hologram which has a transmitting factor (zero-order diffraction factor) higher than 90% for the light from an object and which makes the light from the reconstructed image of the hologram pass through the path of the view finder. This hologram indicator never affects the object's image when the hologram is not illuminated.

3 Claims, 14 Drawing Figures

CAMERA WITH A HOLOGRAPHIC INDICATOR

BACKGROUND OF THE INVENTION

1. Field of the Invention

The present invention relates to a camera having a holographic indicator and more particularly to a camera having a holographic indicator of the type which forms a reconstructed image of a hologram on the same plane as that of an object's image formed by an image forming optical system.

The term "hologram" is used herein to mean interference fringes which are formed by an object bearing light and a reference light and recorded on a recording medium, a copy of the recorded interference fringes, a computer calculated hologram or the like.

2. Description of the Prior Art

A holographic indicator relevant to that of the present invention has been already disclosed in the specification of U.S. Pat. No. 3,633,988. In the known apparatus, a hologram is disposed at a sight window provided in the helmet for a pilot to enable him observe a far distant object simultaneously with an image reconstructed from the hologram at the far distant position.

Also, in U.S. Pat. No. 3,560,921 there is disclosed such a device which enables one to observe a gage of a vehicle and an indicating mark reconstructed from a hologram at the same time.

The subject of the present invention is entirely different from those of the above mentioned U.S. Patents. The present invention relates to the use of a holographic indicator in camera. The present invention is directed to means by which an object's image and a reconstructed image of a hologram can be formed on one and entirely the same plane at the view finder of camera and by which both the images can be observed at the same time through one and the same diopter.

When a camera is provided with a holographic indicator, it is desirable to dispose the hologram in the path of the view finder to permit a compact design of the camera. However, the arrangement of a hologram in the view finder path has a problem that the hologram has an adverse effect on the beam of light directed to the view finder. Such problem never arises in the apparatus disclosed in the above mentioned U.S. Patents specifications. In a camera it is essential that an image of the object be clearly observable through the view finder. By disposing a hologram in the light path of the view finder, the object's image observable in the view finder becomes darkened or clouded which is generally referred to as a phenomenon of darkening. The camera proposed by the present invention is featured in that the hologram disposed in the light path of the view finder never affects the image of the object when no image of the indicating mark is reconstructed and that the object's image can be observed clearly without the phenomenon of darkening.

Our prior application, now U.S. Pat. No. 4,165,930 has proposed a camera having the same feature as described above. But, the camera of the prior application uses a volume type hologram to attain the objects. in contrast, the present invention uses a relief type blazed hologram which is lower in cost and higher in mass producibility than the volume type hologram. To attain the same objects using a relief type blazed hologram, a certain particular condition is given to the diffraction grating of the hologram used according to the present invention.

SUMMARY OF THE INVENTION

It is an object of the present invention to provide a camera having a holographic indicator in which an object's image formed by an image forming optical system and a reconstructed image from a hologram can be formed on the same plane.

It is another object of the invention to provide a camera having a holographic indicator in which the hologram positioned in the path of the image forming optical system never affects the clarity of the object's image when the hologram is not illuminated by light.

It is a further object of the invention to provide a camera having a holographic indicator in which the object's image and the reconstructed image overlap each other on the same plane.

It is still a further object of the invention to provide a camera having a holographic indicator in which the reconstructed image of the hologram is reproducible by ordinary incoherent light on the object's image plane.

Other and further objects, features and advantages of the invention will appear more fully from the following description taken in connection with the accompanying drawings.

DESCRIPTION OF THE PREFERRED EMBODIMENTS

Figures 1, 2, 3:
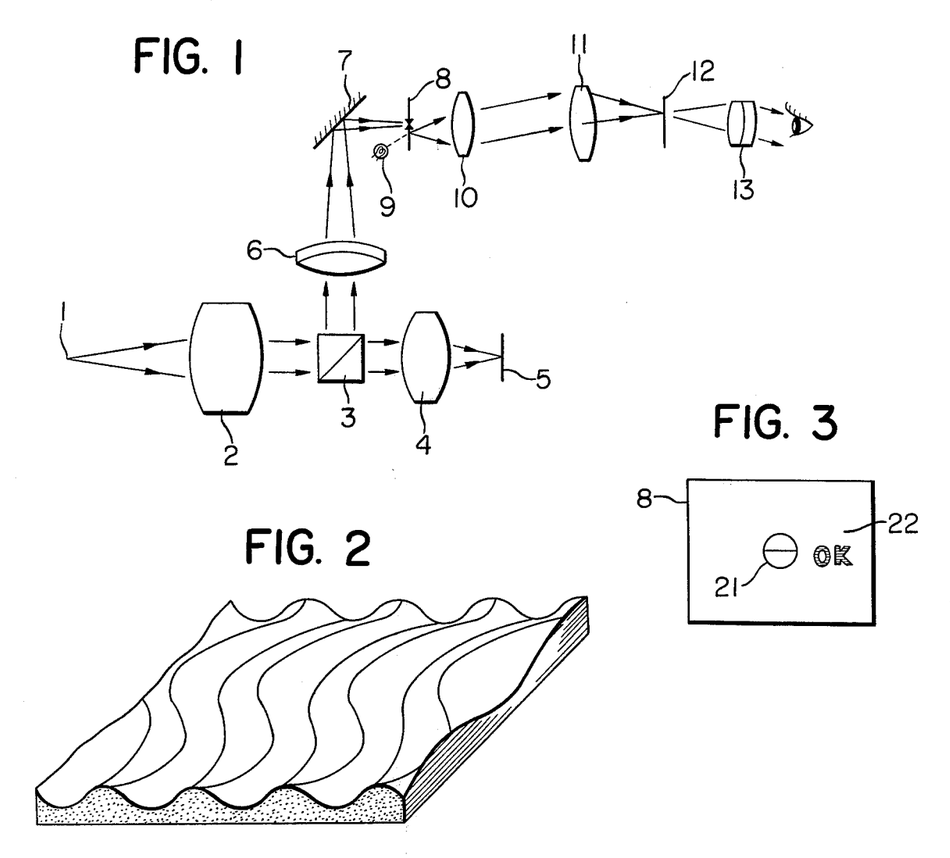
FIG. 1 is a cross-sectional view of an 8 mm cine-camera showing a first embodiment of the invention.
FIG. 2 is a perspective view of a relief type hologram.
FIG. 3 shows an enlarged view of the focusing plate shown in FIG. 1.

Referring first to FIG. 1 showing the first embodiment of the present invention, the reference numeral 1 designates a point on an object to be photographed. 2 is a front lens group for photographing, 3 is a half mirror, 4 is a rear lens group for photographing, 5 in a film plane, 6 is an image forming lens, 7 is a mirror and 8 is a focusing plate having a relief type focused image hologram formed on the surface of the plate. On the hologram there is recorded a pattern of an indication mark. Designated by 9 is a white light source for illuminating the hologram. Lenses designated by 10 and 11 are finder relay lenses and 12 designates a secondary focusing plane. 13 is an eye-piece.

A beam of light coming from the point 1 on the object passes through the front photographing lens group 2, half mirror 3 and imaging lens 6 and forms an image of the object on the focusing plate 8. On the other hand, the relief type focused image hologram on the focusing plate is illuminated by the white light source 9 so that an image of the indication mark is reconstructed on the same focusing plate. The object's image and the reconstructed image of the mark overlap each other on the focusing plate and the two images can be observed through the finder relay lenses and eye-piece with the same degree of visibility.

As shown in detail in FIG. 2, the relief type hologram used in the first embodiment is a relief pattern formed on a recording medium by converting into a corresponding relief pattern the recording information given by an interference between an object-bearing light and a reference light. The hologram used may be a copy of the relief pattern originally formed. Such copy can be obtained in a very simple manner by employing the technique of embossing and therefore it is cheaper and more suitable for mass-production as compared with volume type hologram. Moreover, a focused image hologram has another advantage that white light can be used as the illuminating light for reconstruction. Since the reconstructed image of the focused image hologram appears just on the plane of the hologram, the reconstructed image is observable by white light without getting obscure.

Figure 4:
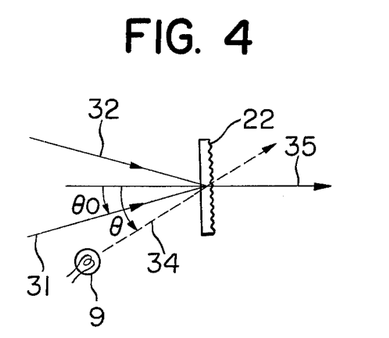
FIG. 4 shows the positional relation between the hologram and light source.

FIG. 3 is an enlarged view of the focusing plate 8 on which a hologram was formed. 21 designates a split prism range finder part and 22 is the relief type focused image hologram recorded in a form of letters "O, K,". FIG. 4 shows the hologram 22 disposed in the light path for the finder.

In FIG. 4, the light source 9 is so positioned as to illuminate the hologram 22. Designated by 31 and 32 are marginal rays of the beam of light forming object's image directed to the finder. When a hologram is disposed in the beam of the object image forming light to indicate an information mark as shown in FIG. 1, particular care should be taken to shut out harmful light to the eye of the observer. If such component of light coming from the illumination light source 9 and transmitted through the hologram (zero-order diffracted light) enters the observer's eye, then it hinders the observer from observing the object's image and/or the information mark. For this reason, it is desirable to make the zero-order diffracted light pass out of the finder relay lenses and eye-piece arranged behind the focusing plate. This can be attained by forming the hologram in accordance with the following teaching:

In FIG. 4, $\theta_o$ is an angle which the marginal rays 31 and 32 form with the optical axis 35 of the finder and $\theta$ is an angle which the transmission light of the hologram, that is, the zero-order diffracted light makes with the finder optical axis. The transmission light constitutes no harmful light when $\theta > \theta_o$. To satisfy the above condition while using the first-order diffracted light as diffracted light useful for indicating the reconstructed image, the hologram used in the embodiment has the following carrier spacial frequency f:

$$f = \frac{\sin\theta}{\lambda} > \frac{\sin\theta}{\lambda} = f_o \tag{1}$$

wherein, $\lambda$ is wavelength of illumination light for reconstruction. For the camera shown in FIG. 1, $\theta_o = 8°$, $\lambda = 0.55$ μm and carrier spacial frequency f of the hologram used: $f > f_o = 253$ lines/mm. Taking into consideration also the size of the illumination light source, $\theta$ must be far larger than $\theta_o$.

Figure 5:
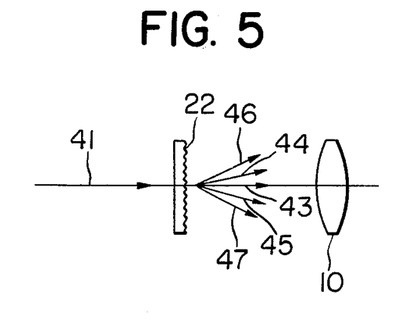
FIGS. 5 and 6 illustrate diffracted light rays by a hologram of a beam of the object's image forming light.
Figure 6:
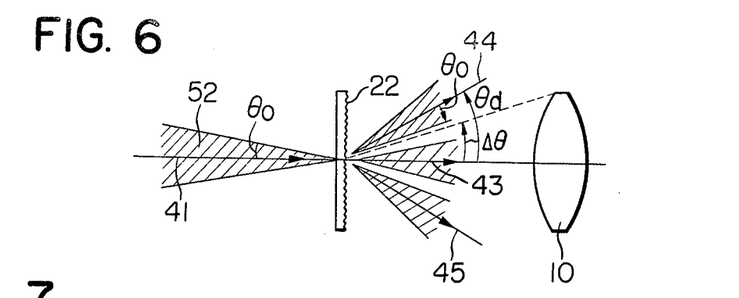

The hologram 22 diffracts also the object image forming light of the finder and there are produced, as shown in FIG. 5, zero-order diffracted light 43, ± first-order diffracted lights 44 and 45, ± second-order diffracted lights 46 and 47 and so on relative to the ray of light on the optical axis 41. When the hologram 22 is low in its carrier spacial frequency, these diffracted lights do not run out of the finder optical system including the relay lens 10 but pass through the finder optical system to be observed. As is well known in the art of focusing plate using a diffraction grating, under the above condition, when the object image forming light gets defocused relative to the hologram, every point on the object's image is observed as a split multi-image point. Further, because of the color diffusion by the diffraction grating, the image is observed getting colored. However, since the hologram in this embodiment is used to indicate an information mark, it is desired that the hologram itself should have the possible least offset on the object image to be observed. To satisfy the requirement, the hologram has to have such diffraction property which produces ± first- and higher-order diffracted lights other than transmission light of the object image forming beam going out of the finder optical system arranged after the relay lens 10 to prevent these diffracted lights from entering the observer's eye. More particularly, the hologram used in the embodiment of the invention must satisfy the following condition in addition to the above condition (1):

$$\theta d > \Delta\theta + \theta_o \tag{2}$$

wherein, $\theta d$ is an angle which the first-order diffracted rays of the object image forming light on the optical axis make with the optical axis (see FIG. 6) and $\Delta\theta$ is the maximum angle of the beam of effective light entering the finder optical system behind the relay lens 10.

Since generally $\Delta\theta \approx \theta_o$ for the finder of a common 8 mm cine-camera, the formula (2) is essentially equivalent to $$\theta d > 2\theta_o$$

Therefore, the hologram used in this embodiment has a high carrier spatial frequency f given by the following conditional formula (3):

$$f = \frac{\sin\theta d}{\lambda} > \frac{\sin 2\theta_o}{\lambda} \tag{3}$$

Since the value of $\theta_o$ is generally extremely small, the above formula (3) approximates to the following formula (4):

$$f > \frac{2\sin\theta_o}{\lambda} = 2f_o \tag{4}$$

The condition of the above formula (4) always satisfies the condition given by the formula (1). Therefore, the hologram used in this embodiment is a hologram which satisfies the condition of the formula (3). By using such hologram, there is observed a clear object's image which is never split. Also, other undesirable phenomenon such as flare caused by the zero-order diffracted light from the light source for illuminating the hologram can be eliminated.

As previously mentioned, when all of the diffracted rays resulting from diffraction of the object image forming light by the hologram are removed, there arises a problem of darkening. The hologram used in this embodiment of the invention has a particular property of diffraction to reduce the phenomenon of darkening as will be described hereinafter.

When loss of light caused by reflection on the hologram and/or absorption by the hologram is neglected, the quantity of effective light to the finder after passing through the hologram, $J_F$ is given by:

$$J_F = J \cdot \eta_o = J\left(1 - \sum_{n \neq o} \eta_n\right) \quad (5)$$

wherein, $J$ is quantity of light incident upon the hologram with respect to the object image forming light and $\eta_n$ is diffraction efficiency of n-order diffracted light of the hologram.

According to the above formula (5), the difference in quantity of effective light between hologram portion and non-hologram portion is represented by $$J \sum_{n \neq o} \eta_n.$$

Thus, the object image of hologram portion, when observed, gets darkened by $$J \sum_{n \neq o} \eta_n.$$

This phenomenon is called "darkening".

To reduce this darkening phenomenon, it is necessary that the diffraction efficiency of the hologram be reduced to a lower level, that is, the total quantity of diffracted light $$J \sum_{n \neq o} \eta_n$$

be kept at a smaller value. However, this reduction in diffraction efficiency of the hologram causes another problem. By the reduction of diffraction efficiency there is caused, on the other hand, a substantial decrease in the brightness of the image of information mark reconstructed by the illuminating light source for hologram reconstruction. This decrease in brightness makes it difficult to observe the image of information mark clearly.

Figures 7, 8, 9:
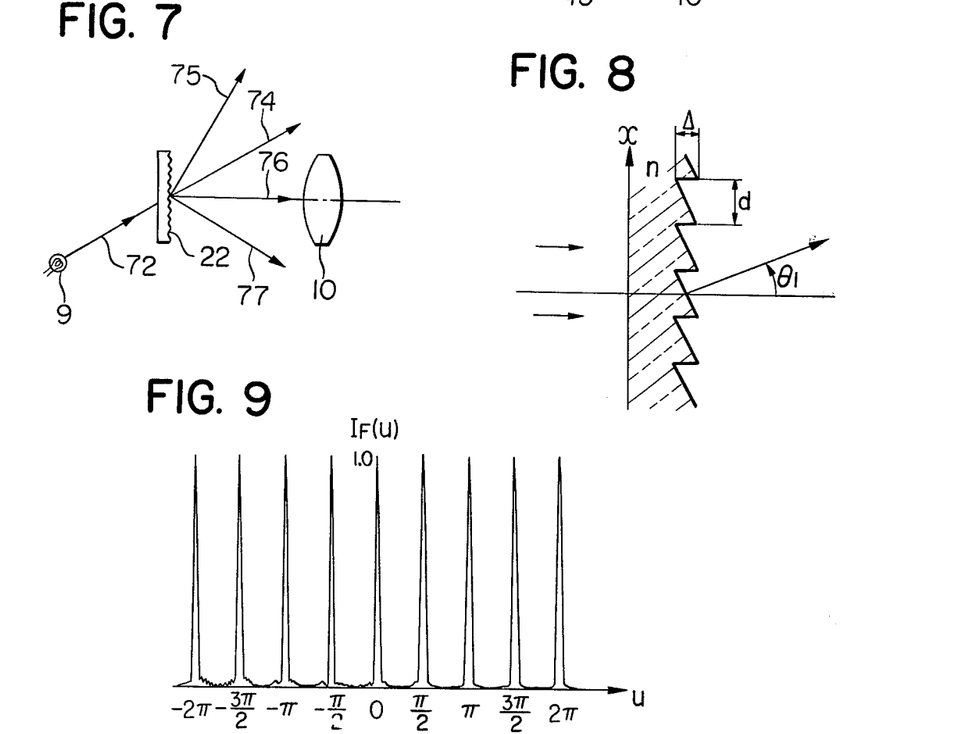
FIG. 7 illustrates diffracted light rays by hologram of a beam of illuminating light for reconstruction.
FIG. 8 is an explanatory view of a relief type blazed hologram.
FIGS. 9 and 10 show the distribution of factors by which the diffraction efficiency of a hologram is determined.

For the sake of explanation, it is assumed that the indication of information mark be effected by using $-1$st-order diffracted light 76 which is a component of the illumination light for reconstruction 72 diffracted by the hologram 22 in the direction of the optical axis as shown in FIG. 7. In FIG. 7, the transmission light is designated by 74, 1st-order diffracted light by 75 and $-2$nd-order diffracted light by 77 respectively. In this case, let $J_M$ denote the brightness of the information mark and $J'$ the quantity of the illumination light for reconstruction 72. Then, $$J_M = J' \cdot \eta_{-1} \quad (6)$$

Therefore, from the above formulae (5) and (6), it is understood that to obtain an indicating device of information mark which provides a bright indication of the information mark and, when no indication is done, that is, when the light source 9 is Off, to minimize the darkening phenomenon, it is required to satisfy two conditions at the same time. One of the two conditions is to reduce the diffraction efficiency of all the diffracted lights other than transmission light as much as possible. Another is to maintain the quantity of light at such level that the product of the quantity of light of the illumination light for reconstruction and $-1$st-order diffraction efficiency may be sufficiently detected in the transmission light of the object image forming light. As for the first mentioned condition, the inventors of the present application have experimentally found that when the hologram used has a transmitting factor neglecting losses (zero-order diffraction factor) higher than 90% and preferably higher than 95%, the darkening phenomenon of the information mark part can be reduced greatly to the extent that darkening becomes no longer remarkable for observation. Therefore, the second mentioned condition can be satisfied by making $J'\eta_{-1}$ have a sufficient quantity of light for the indication of information mark while keeping the total diffraction efficiency $$\sum_{n \neq o} \eta_n$$

except for zero-order at a level lower than 10%. This may be attained by greatly increasing the quantity of illumination light for reconstruction. However, this involves the use of large electric power for the light source or the use of a particular type of light source. Therefore, this solution is not preferred. To attain the same purpose without any disadvantage, it is desired to increase the diffraction efficiency of a certain selected order of diffracted light used for indication exclusively while reducing the diffraction efficiency of all other orders of diffracted lights to a minimum. In the example now being described, the diffracted light used to indicate the information mark is $\eta_{-1}$ and for all the cases of n, $\eta_n \geq 0$. Therefore, if the diffraction efficiency in all orders other than $\eta_{-1}$ is near 0 (zero), then it is possible to give $\eta_{-1}$ the largest diffraction efficiency among others. But, none of the known common holograms has such desirable property in respect of diffraction. Only one exception is such hologram generally called "blazed hologram". It is known in the art that this blazed hologram has a particularly high diffraction efficiency for a certain order of diffracted light excluding zero-order. However, since, as previously noted, the hologram used in the present invention should have a transmitting factor higher than 90% for the light coming from the object, no conventional blazed hologram can be suitably used for the present invention. According to the present invention, there is used a blazed hologram improved in diffraction property in such manner that it has a transmitting factor higher than 90% and the intensity of first-order diffracted light is far higher than those of diffracted lights in other orders. As to the manufacture of such improved blazed hologram, a detailed description will be made hereinafter.

FIG. 8 illustrates a phase-type diffraction grating (grating pitch: d, height of relief: $\Delta$ and refractive index:

n). Now, we will find the value of intensity for every diffraction order.

A plane wave enters the phase diffraction grating perpendicularly (normal incidence) and after passing through the grating the plane wave has a phase distribution of $\phi_{(x)}$. Omitting constant term $\phi_{(x)}$ is given by the following equation:

$$\phi_{(x)} = \frac{2\pi(n-1)}{\lambda} \cdot \frac{\Delta}{d} \cdot x$$

Spectral intensity of this beam of light (I(u)) is given by:

$$I(u) = E(u) \cdot IF(u) \quad (7)$$

wherein, $$E(u) = \left| \int_0^d \exp[i\phi(x)] \exp[i\frac{4ux}{d}] dx \right|^2 \quad (8)$$

$$IF(u) = \frac{\sin^2 2Nu}{\sin^2 2u} \quad (9)$$

wherein, $u = \pi d \sin\theta_1/2\lambda$, N is the number of grating lines and $\theta_1$ is diffraction angle.

By calculating E(u), there is given:

$$E(u) = \left| \frac{d}{2u+\alpha} \left( \exp Ei(2u+d) \right) \sin(2u+\alpha) \right|^2 \quad (10)$$

$$\alpha \left| \frac{\sin(2u+\alpha)}{2u+\alpha} \right|^2$$

wherein, $\alpha = \pi(n-1)\Delta/\lambda$.

The distribution of IF obtained is shown in FIG. 9 which has peaks corresponding to the respective orders of spectra owing to the periodic structure of the diffraction grating.

Figure 10:
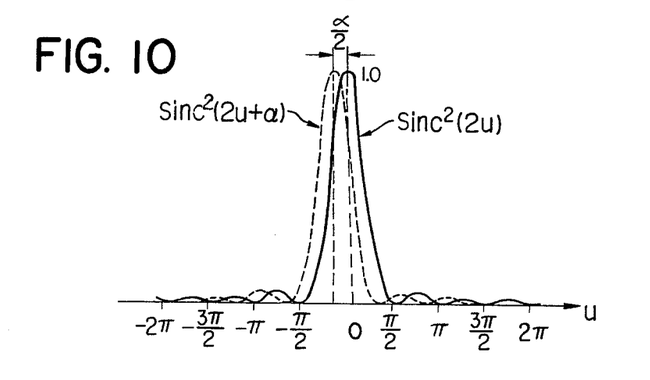

The curve of E(u) obtained is shown in FIG. 10. As seen in FIG. 10, the curve is equal to that which is given by parallel translation of sin C²(2u) by α/2 in minus direction. Therefore, the respective values of I(u) are given by the values of E(u) corresponding to the respective spectra for $u = 0$, $\pm\pi/-2$, $\pm\pi$, and so on.

For conventional blazed holograms, their property in diffraction is usually so determined that $\alpha = \pi$ and 1st-order diffracted light becomes the peak. This makes the transmitting factor (zero-order diffraction factor) o, and therefore such hologram is unsuitable for the present embodiment of the invention. For a hologram suitable for the present embodiment, it is necessary to have a transmitting factor of $I(o)/Ii \geq 0.9$ wherein Ii is the quantity of light coming from the object and entering the hologram.

Since there is a relation of $$\Delta = \frac{\lambda}{\pi(n-1)} \alpha$$

between the value of α and the relief height Δ, the value of α can be suitably determined by suitably selecting the height independently of the pitch so as to obtain the most desirable value of diffraction efficiency for a certain diffraction order.

Figure 11:
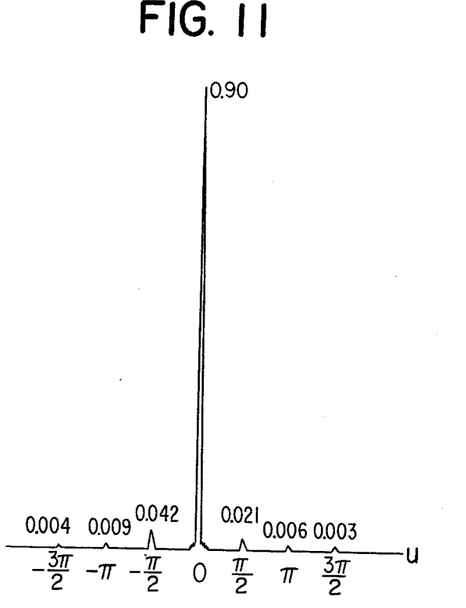
FIG. 11 is a curve for explaining the diffraction efficiency of the hologram used in the first embodiment.

For example, let $\alpha = 0.560$. Then, a value of Δ corresponding to it is determined which $\Delta = 0.214$ μm assuming that n = 1.50 and λ = 0.60 μm. By calculating I(u) for light at λ = 0.60 μm with that value of α there is obtained the distribution shown in FIG. 11. Values found in the distribution are: transmitting factor (zero-order diffraction efficiency) 90%, −1st-order diffraction efficiency 4.2%, +1st-order diffraction efficiency 2.1%, −2nd-order diffraction efficiency 0.9% and +2nd-order diffraction efficiency 0.6%. In this manner, a diffraction grating of particularly high transmitting factor can be obtained which has a blazed effect.

In the above, explanation has been made regarding the case of normal incidence of light upon the diffraction grating. In case of oblique incidence, the phase distribution of incident light is $$\exp[i\frac{2\pi}{\lambda} \cdot x \cdot \sin\phi]$$

wherein $\phi$ is the incident angle. Calculation using the phase distribution in the integral of the above formula (8) gives a formula equal to the above formula (10) except for the change that $$u = \frac{\pi d}{2\lambda}(\sin\theta_1 - \sin\phi).$$

When $\theta_1$ and $\phi$ are very small, $\sin\theta_1 - \sin\phi \simeq \sin(\theta_1 - \phi)$. This means that the distribution curve for oblique incidence is given by a parallel translation of the curve for normal incidence by $\phi$ respecting the exit angle of diffracted light. Therefore, the results found by calculation for normal incidence can be used also for oblique incidence with only the necessity of doing a parallel translation of exit angle by $\phi$.

Fabrication of holograms having a diffraction grating structure as shown above will be described hereinafter.

Figure 12:
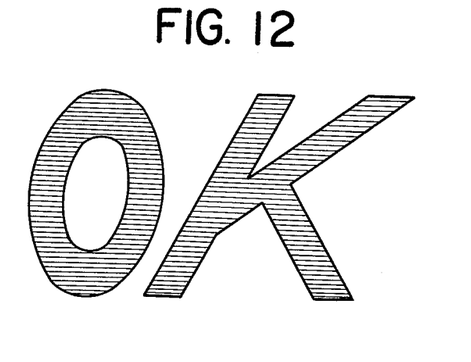
FIG. 12 shows the indicating part of the hologram.

FIG. 12 shows a master of hologram used in the embodiment in which the above described diffraction grating structure is superimposed on the part of letters OK. Like the ruled grating shown in FIG. 8, the master hologram can be fabricated using a ruling engine. Since the hologram shown in FIG. 12 has its diffraction grating structure only on the limited area covering the letters OK, the fabrication thereof may be done also using Numerical Control ruling engine.

After such master has been once prepared, a great number of holograms can be copied from the hologram master employing a suitable method such as emboss copying method.

For holograms having a diffraction grating structure as shown in FIG. 8, other various fabricating methods may be used examples of which are as follows:

Sheridon's method; U.S. Pat. No. 3,680,945 "Fabrication of Refractive Blazed Holograms".

Y. Aoyagi et al. "Blazed Ion-Etched Holographic Gratings" Opt. Acta 23, 701 (1976).

According to these methods, the hologram used in the present embodiment may be fabricated by additionally using a technique to provide the diffraction grating structure selectively only within an indication mark pattern such as characters. For example, when Sheridon's method is employed, the desired diffraction grating structure can be obtained by making an image hologram of the indication mark pattern for which a plane wave is used as reference beam.

When the ion beam etching method is employed, a mask corresponding to the indication mark pattern is placed, before etching, on a substrate on which the desired diffraction grating is to be formed. In this case, the mask is a pattern of such substance which is resistive to ion beam, that is, slow in being etched. Alternatively, a mask is placed to cover only the indication mark pattern area after ion beam etching and the remaining uncovered area is subjected to a chemical etching treatment to erase the grating structure previously formed on the area.

Figure 13:
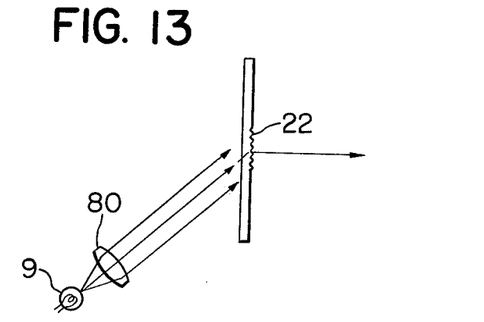
FIG. 13 shows another embodiment in which the hologram is illuminated by a parallel beam of light.

The hologram fabricated in this manner is a kind of diffraction grating and therefore it is desirable that the illumination beam of light used to reconstruct the hologram be of plane wave. If spherical wave illumination beam is used, there occurs sometimes an unfavourable phenomenon that the image of the indication mark pattern in the observer's eye looks changed in color in the direction normal to the direction in which the carrier grating of the hologram extends, in particular when the observer's eye is fixed at a certain position on the eye point. This unfavourable phenomenon may be obviated by transforming the beam of light for illuminating the hologram shown in FIG. 1 into a beam of illumination light that approximates a plane wave in the manner shown in FIG. 13.

Another solution to the problem is to fabricate the carrier grating in such manner that it changes depending upon the position of the hologram so as to correspond to the interference fringes of spherical wave and plane wave. In other words, the carrier grating of the hologram is so fabricated as to have a pitch and curvature corresponding to an out-of-axis Fresnel zone plate. By doing so, the observer can view the indication mark pattern in one and same color over the entire surface of the pattern even when the hologram is illuminated by spherical reference light and the observer's eye is fixed at a certain point on the eye point. To this end, an image hologram is fabricated according to Sheridon's method using a N.C. ruling engine and spherical reference beam.

While the indicating device of information mark described above is of the transmission illuminating type, that of reflection illuminating type is also useful for the present invention.

Figure 14:
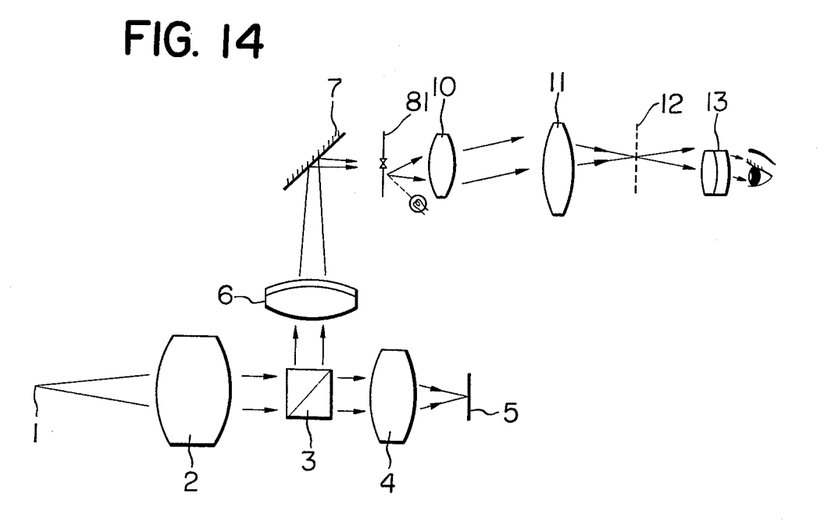
FIG. 14 is a cross-sectional view of an 8 mm cine-camera in which a reflection type of relief hologram is used.

FIG. 14 schematically shows an embodiment of information mark indicating apparatus of the reflection illuminating type.

Designated by 81 is a focusing plate containing a reflection type of hologram. Compared with the arrangement shown in FIG. 1, the position of illumination light source 9 is altered. Arrangement of other parts is essentially the same as that shown in FIG. 1.

Illumination light emitted from the light source 9 is diffracted by the hologram and its first-order refracted light enters the observer's eye through the finder optical system so that a reconstructed image of the information mark becomes observable. Among the rays of the illumination light, zero-order diffracted light component, that is, the component of light regularly reflected on the hologram can not enter the observer's eye since such component is made to run out of the finder optical system, which is the same as in the case of transmission type. Also, like the case of transmission type described above, the reflection type hologram has to have a transmitting factor higher than 90%.

When the reflection type diffraction grating has the same shape as that shown in FIG. 8, the phase distribution of reflected rays $\phi(x)$ becomes:

$$\phi(x) = 2 \cdot 2\pi/\lambda \cdot \Delta/d \cdot x$$

Thus, the distribution becomes larger than that of the transmission type by $(2/n-1)$ times. By substituting $\Delta'$ for $\Delta$ using $\Delta' = (2/n-1)\Delta$, the above formulae given for the case of transmission type become applicable also for this case of reflection type without any further changes. Namely, the height of relief required for reflection type hologram is only $n-1/2$ of the height required for the above described transmission type hologram. But, this is applicable only to the case wherein the reflectance to the hologram illuminating light is 1.0. In practice, the reflectance is smaller than 1.0. Therefore, a higher refraction efficiency is required to obtain a reconstructed image having the same brightness as that obtainable in the case of transmission type.

Also, when the reflection type hologram is used, the amount of the object image forming light transmitted through the hologram is decreased to an extent corresponding to the reflectance of the hologram as compared with the transmission type hologram. Accordingly, the darkening phenomenon is enhanced. For that reason it is preferable that the reflectance of the hologram is as low as possible. Therefore, in this case, it is desirable that the reflection type hologram used has a relatively high reflectance for an oblique incident illumination light but has a relative low reflectance for a normal or near normal incident light for forming an image of the object. This may be achieved by applying a multi-layer coating on the hologram area or on the surface of the focusing plate so as to give it a low reflectance for normal incidence and a high reflectance for oblique incidence.

While the invention has been particularly shown and described with reference to preferred embodiments thereof, it will be understood by those skilled in the art that the foregoing and other changes in form and details can be made therein departing from the spirit and scope of the invention.

What we claim is:

1. A camera having a holographic indicator comprising:
   objective lens means for forming an image of an object on recording means;
   exposure control means for determining the amount of exposure of said recording means; and
   a view finder including:
   a image forming optical system for directing the light from said object along a path and forming a second image of said object on an image plane;
   a relief type blazed hologram for recording the information of the indicating mark and having a transmitting factor high enough for the second image of the object to be observed and a diffraction efficiency high enough for the reconstructed image to be observed, said relief type blazed hologram having a diffraction grating condition wherein phase factor $\alpha$ defined by the difference in refractive indexes between said hologram and the ambient contacting therewith multiplied by $\pi\Delta/\lambda$ is not more than 0.56, where $\Delta$ is the height of relief and $\lambda$ is the wavelength of incident ligh, whereby the zero-order diffraction factor of the hologram for the light from the object is higher than 90%;
   carrying means for holding said relief type blazed hologram in said path of light from the object;
   illuminating means arranged out of said path for illuminating said hologram to obtain a reconstructed image of the indicating mark on the same plane as that of the second image of the object; and optical means for viewing the reconstructed image and the second image;

said illuminating means being arranged to illuminate the hologram from such a direction in which the transmitting light through the hologram passes out of the path of said optical means, and said hologram having a spatial frequency which causes the light from the reconstructed image to pass through said optical means and each diffracted light from the object to pass out of said optical means.

2. A camera having a holographic indicator according to claim 1, wherein said hologram is a focused image hologram and arranged on the same plane as the second image of the object overlapping each other.

3. A camera having a holographic indicator according to claim 1, wherein said objective lens means and said image forming means have each a light conductive portion.

* * * * *

UNITED STATES PATENT AND TRADEMARK OFFICE
CERTIFICATE OF CORRECTION

PATENT NO. : 4,255,032
DATED : March 10, 1981
INVENTOR(S) : KAZUYA MATSUMOTO, et al.

It is certified that error appears in the above—identified patent and that said Letters Patent is hereby corrected as shown below:

Col. 2, line 62, change "in" to --is--.

Col. 7, line 9, change " (n 1) " to -- (n - 1) --;

line 15 (Equation 7), insert -- = -- after "I(u)";

line 20 (Equation 8), insert -- - -- after "exp[ "

both occurrences;

line 60, change " (n 1) " to -- (n-1) --.

*Signed and Sealed this*

*Thirtieth* Day of *June 1981*

[SEAL]

*Attest:*

RENE D. TEGTMEYER

*Attesting Officer*      *Acting Commissioner of Patents and Trademarks*